(12) United States Patent
Beach et al.

(10) Patent No.: US 11,821,646 B2
(45) Date of Patent: Nov. 21, 2023

(54) NON-CONTINUOUSLY ROTATABLE AND REMOVABLE FERRULE FOR DUCT FITTING

(71) Applicant: RHEIA, LLC, Phoenix, AZ (US)

(72) Inventors: Robert Beach, Pittsburgh, PA (US); Andrew Poerschke, Pittsburgh, PA (US); Nigel Watts, Bradford Woods, PA (US)

(73) Assignee: RHEIA, LLC, Phoenix, AZ (US)

( * ) Notice: Subject to any disclaimer, the term of this patent is extended or adjusted under 35 U.S.C. 154(b) by 321 days.

(21) Appl. No.: 16/817,065

(22) Filed: Mar. 12, 2020

(65) Prior Publication Data

US 2021/0285684 A1 Sep. 16, 2021

(51) Int. Cl.
*F24F 13/02* (2006.01)
*F16L 15/00* (2006.01)

(52) U.S. Cl.
CPC ........ *F24F 13/0209* (2013.01); *F16L 15/001* (2013.01); *F24F 13/0218* (2013.01)

(58) Field of Classification Search
CPC ... F16L 33/24; F16L 33/0985; F16L 37/0985; F24F 13/0218; F24F 13/0209
USPC ................ 285/424, 903, 256, 361, 402, 239
See application file for complete search history.

(56) References Cited

U.S. PATENT DOCUMENTS

| | | | |
|---|---|---|---|
| 2,475,322 A | 7/1949 | Horton et al. | |
| 2,918,314 A | 7/1955 | Kemnitz | |
| 3,393,267 A | 7/1968 | Busse | |
| 3,408,099 A | 10/1968 | Appleton | |
| 3,596,936 A * | 8/1971 | Dieckmann | F24F 13/0209 285/423 |
| 4,082,327 A * | 4/1978 | Sting | F16L 37/252 285/401 |

(Continued)

FOREIGN PATENT DOCUMENTS

| | | |
|---|---|---|
| DE | 1747267 | 6/1957 |
| DE | 4443005 | 6/1995 |

(Continued)

OTHER PUBLICATIONS

European Search Report dated Aug. 8, 2023 issued in EP Application No. 21766826.8.

(Continued)

*Primary Examiner* — David Bochna
(74) *Attorney, Agent, or Firm* — The Webb Law Firm

(57) ABSTRACT

A fitting assembly for connection to a flexible duct includes a ferrule configured for insertion into an open end of the flexible duct a fitting removably connected to the ferrule. The ferrule includes a sidewall defining a minor diameter and a major diameter spaced apart from the minor diameter, and a ferrule thread extending radially outward from the sidewall. One of the fitting and the ferrule defines a recess. Another of the fitting and the ferrule comprises a tab configured to extend into the recess. One of the recess and the tab comprises an edge. Another of the recess and the tab comprises a ramped surface extending in a circumferential direction of the ferrule, such that rotation of the ferrule relative to the fitting causes the ramped surface to engage the edge, thereby radially deflecting the tab and disengaging the tab from the recess.

26 Claims, 6 Drawing Sheets

(56) References Cited

U.S. PATENT DOCUMENTS

| | | | | |
|---|---|---|---|---|
| 4,099,747 | A | * | 7/1978 | Meserole ............ F24F 13/0209 |
| | | | | 285/424 |
| 4,169,967 | A | * | 10/1979 | Bachle ................. F16L 33/224 |
| | | | | 285/343 |
| 4,174,858 | A | * | 11/1979 | Brooks ................... A47L 9/242 |
| | | | | 285/903 |
| 4,286,808 | A | * | 9/1981 | Fouss ................... F16L 37/008 |
| | | | | 285/903 |
| 4,369,992 | A | | 1/1983 | Fournier et al. |
| 4,418,943 | A | | 12/1983 | Ionna |
| 4,457,544 | A | * | 7/1984 | Snow ...................... F16L 33/30 |
| | | | | 285/391 |
| 4,629,827 | A | | 12/1986 | Baxter |
| 4,679,827 | A | | 7/1987 | Law |
| 4,708,370 | A | * | 11/1987 | Todd ................... F16L 25/0045 |
| | | | | 285/361 |
| 4,930,815 | A | | 6/1990 | Tuggler, Jr. |
| 4,941,783 | A | * | 7/1990 | Maier ................... E21B 17/046 |
| | | | | 285/401 |
| 5,087,084 | A | * | 2/1992 | Gehring ............. F16L 25/0045 |
| | | | | 285/321 |
| 5,346,264 | A | * | 9/1994 | Law ................... F16L 25/0045 |
| | | | | 285/903 |
| 6,273,145 | B1 | | 8/2001 | Botting |
| 6,585,297 | B2 | | 7/2003 | Mullen, Jr. |
| 6,767,280 | B1 | * | 7/2004 | Berger ................ F24F 13/0218 |
| | | | | 454/339 |
| 7,393,021 | B1 | * | 7/2008 | Lukjan ................ F24F 13/0209 |
| | | | | 285/183 |
| 2010/0244438 | A1 | | 9/2010 | Johanson |
| 2013/0331022 | A1 | | 12/2013 | Sandman et al. |
| 2014/0049043 | A1 | * | 2/2014 | Hamman, Jr. ...... F24F 13/0209 |
| | | | | 285/320 |
| 2021/0247098 | A1 | * | 8/2021 | Poerschke ........... F24F 13/0218 |

FOREIGN PATENT DOCUMENTS

| | | | |
|---|---|---|---|
| FR | 3033032 A1 | 8/2016 | |
| FR | 3057339 | 4/2018 | |
| GB | 2259342 A * | 3/1993 | .......... F16L 37/0985 |
| WO | 2011066612 A1 | 6/2011 | |
| WO | 2018004768 A1 | 1/2018 | |

OTHER PUBLICATIONS

European Search Report dated Aug. 8, 2023 issued in EP Application No. 21754572.2.

Office Action dated Aug. 18, 2023 issued in U.S. Appl. No. 16/788,772.

* cited by examiner

NON-CONTINUOUSLY ROTATABLE AND REMOVABLE FERRULE FOR DUCT FITTING

BACKGROUND

Field

The present disclosure generally relates to fittings for connecting flexible ducts in heating, ventilation, and air conditioning (HVAC) applications. More specifically, the present disclosure is related to a fitting assembly, a ferrule, a ductwork assembly, and a method of connecting a flexible duct to a fitting and/or ferrule.

Description of the Related Art

Non-rigid ducting is widely used in residential and commercial HVAC applications to economically install long sections of ductwork in substantially straight lines or large-radius curves. However, rigid fittings must be used where tight curves are required or where the ducting connects to other components of the HVAC system. Conventionally, such rigid fittings are made of sheet metal and require the use of mastic and/or mechanical fasteners to ensure a solid and air-tight seal with the ducting, adding labor and material expense to the installation process. This is largely due to the inconsistency of sheet metal fittings, and their inherently leaky stamped construction. Moreover, spreading or spraying mastic on all sides of ductwork is challenging as the ductwork is often installed in tight chases and cavities with no access to the obscured side. Additionally, because of the sharp edges and design of conventional sheet metal fittings, it is often difficult to stretch ductwork over the fitting. Exacerbating these issues is that the large diameter of conventional ducting makes it difficult to hold both the ducting and the fitting when making the necessary connections. Once the ducting is stretched over the fitting, the installer must attach zip ties and screws while working against the tension of the duct. Often this requires several tries from the installer to finish the connection. Additionally, because the connection generally must be made while the ducting is under tension, it is difficult to properly stretch the duct to length as the ducting inherently pulls itself back to its natural state.

SUMMARY

In view of the foregoing, there exists a need for ductwork assemblies, components thereof, and methods of assembling a ductwork assembly that simplify the process of installing ductwork.

Embodiments of the present disclosure are directed to a fitting assembly for connection to a flexible duct. The fitting assembly may include a ferrule configured for insertion into an open end of the flexible duct. The ferrule may include a sidewall defining a minor diameter and a major diameter spaced apart from the minor diameter, and a ferrule thread extending radially outward from the sidewall. The fitting assembly may further include a fitting removably connected to the ferrule. The minor diameter is less than or equal to an inner diameter of the flexible duct with the flexible duct in an untensioned state. The major diameter is greater than the inner diameter of the flexible duct with the flexible duct fully elongated. One of the fitting and the ferrule defines a recess. Another of the fitting and the ferrule includes a tab configured to extend into the recess. One of the recess and the tab includes an edge. Another of the recess and the tab includes a ramped surface extending in a circumferential direction of the ferrule, such that rotation of the ferrule relative to the fitting causes the ramped surface to engage the edge, thereby radially deflecting the tab and disengaging the tab from the recess.

In some embodiments, the recess is formed in an external surface of the fitting.

In some embodiments, engagement of the tab and the recess limits rotation of the ferrule relative to the fitting about the a longitudinal axis of the ferrule and the fitting when a rotational force applied to the ferrule relative to the fitting is less than a force required to radially deflect the tab.

In some embodiments, the ferrule includes a grip for assisting a user in grasping the ferrule during at least one of connection of the ferrule to the flexible duct, and connection of the ferrule to the fitting.

In some embodiments, the ferrule thread includes a discontinuous portion.

In some embodiments, the discontinuous portion includes a break extending from a crest of the ferrule thread to the sidewall of the ferrule. The break is configured to bite into the flexible duct to prevent unthreading of the flexible duct from the ferrule thread.

In some embodiments, the discontinuous portion includes a ramped surface extending from the sidewall of the ferrule to a crest of the ferrule thread.

In some embodiments, the ferrule further includes a circumferential depression for receiving a terminal end of the flexible duct.

In some embodiments, the fitting assembly further includes a clamp surrounding the circumferential depression and configured to clamp the flexible duct to the ferrule.

In some embodiments, a taper of the sidewall of the ferrule is configured to stretch a sheet material of the flexible duct as the ferrule is threaded into the flexible duct.

In some embodiments, a pitch of the ferrule thread is less than or equal to a pitch of a helix structure of the flexible duct with the flexible duct fully elongated.

In some embodiments, an outer diameter of the ferrule thread is larger than an inner diameter of a helix structure of the flexible duct when a pitch of the ferrule thread is equal to a pitch of the helix structure.

In some embodiments, the connection between the fitting and the ferrule is substantially air tight without application of a sealant material.

In some embodiments, the fitting assembly further includes a gasket or sealant material disposed at an interface of the fitting and the ferrule.

In some embodiments, the fitting includes at least one of an elbow, a tee, a wye, a manifold takeoff, a coupling, a terminal boot, a cap, a plug, a union, and a flange.

Other embodiments of the present disclosure are directed to a ferrule for connecting to a flexible duct. The ferrule includes a sidewall defining a minor diameter and a major diameter spaced apart from the minor diameter and a ferrule thread extending radially outward from the sidewall. The ferrule may further include at least one of a tab configured to extend into a recess of a fitting, the tab configured to radially deflect and disengage from the recess of the fitting upon rotation of the ferrule relative to the fitting; and a recess configured to receive a tab of the fitting, the recess configured to radially deflect the tab of the fitting upon rotation of the ferrule relative to the fitting. The minor diameter is less than or equal to an inner diameter of the flexible duct with the flexible duct in an untensioned state.

The major diameter is greater than the inner diameter of the flexible duct with the flexible duct fully elongated.

In some embodiments, engagement of the tab with the recess of the fitting limits rotation of the ferrule relative to the fitting about the a longitudinal axis of the ferrule and the fitting when a rotational force applied to the ferrule relative to the fitting is less than a force required to radially deflect the tab.

In some embodiments, the ferrule thread includes a discontinuous portion.

In some embodiments, the discontinuous portion includes a break extending from a crest of the ferrule thread to the sidewall, wherein the break is configured to bite into the flexible duct to prevent unthreading of the flexible duct from the ferrule thread.

In some embodiments, the discontinuous portion includes a ramped surface extending from the sidewall to a crest of the ferrule thread.

In some embodiments, the ferrule further includes a circumferential depression for receiving a terminal end of the flexible duct.

In some embodiments, a taper of the sidewall is configured to stretch a sheet material of the flexible duct as the flexible duct is threaded onto the ferrule thread.

In some embodiments, a pitch of the ferrule thread is less than a pitch of a helix structure of the flexible duct with the flexible duct fully elongated.

In some embodiments, an outer diameter of the ferrule thread is larger than an inner diameter of a helix structure of the flexible duct when a pitch of the ferrule thread is equal to a pitch of the helix structure.

Other embodiments of the present disclosure are directed to a ductwork assembly including a duct having a helix structure and a flexible sheet material surrounding the helix structure. The ductwork assembly may further include a ferrule including a sidewall defining a minor diameter and a major diameter spaced apart from the minor diameter and a ferrule thread extending radially outward from the sidewall. The ferrule may include at least one of a tab configured to extend into a recess of a fitting, the tab configured to radially deflect and disengage from the recess of the fitting upon rotation of the ferrule relative to the fitting; and a recess configured to receive a tab of the fitting, the recess configured to radially deflect the tab of the fitting upon rotation of the ferrule relative to the fitting. The minor diameter is less than or equal to an inner diameter of the flexible duct with the flexible duct in an untensioned state. The major diameter is greater than the inner diameter of the flexible duct with the flexible duct fully elongated. The helix structure of the duct is threaded over the ferrule thread such that the flexible sheet material of the duct is stretched radially outward by the sidewall of the ferrule.

In some embodiments, the ductwork assembly further includes a fitting removably connected to the ferrule. The fitting includes at least one of an elbow, a tee, a wye, a manifold takeoff, a coupling, a terminal boot, a cap, a plug, a union, and a flange.

Further embodiments of the present disclosure are described in the following numbered clauses:

Clause 1. A fitting assembly for connection to a flexible duct, the fitting assembly comprising: a ferrule configured for insertion into an open end of the flexible duct, the ferrule comprising: a sidewall defining a minor diameter and a major diameter spaced apart from the minor diameter; and a ferrule thread extending radially outward from the sidewall; a fitting removably connected to the ferrule, wherein the minor diameter is less than or equal to an inner diameter of the flexible duct with the flexible duct in an untensioned state, wherein the major diameter is greater than the inner diameter of the flexible duct with the flexible duct fully elongated, wherein one of the fitting and the ferrule defines a recess, wherein another of the fitting and the ferrule comprises a tab configured to extend into the recess, wherein one of the recess and the tab comprises an edge, and wherein another of the recess and the tab comprises a ramped surface extending in a circumferential direction of the ferrule, such that rotation of the ferrule relative to the fitting causes the ramped surface to engage the edge, thereby radially deflecting the tab and disengaging the tab from the recess.

Clause 2. The fitting assembly according to clause 1, wherein the recess is formed in an external surface of the fitting.

Clause 3. The fitting assembly according to clause 1 or 2, wherein engagement of the tab and the recess limits rotation of the ferrule relative to the fitting about the a longitudinal axis of the ferrule and the fitting when a rotational force applied to the ferrule relative to the fitting is less than a force required to radially deflect the tab.

Clause 4. The fitting assembly according to any of clauses 1 to 3, wherein the ferrule comprises a grip for assisting a user in grasping the ferrule during at least one of: connection of the ferrule to the flexible duct; and connection of the ferrule to the fitting.

Clause 5. The fitting assembly according to any of clauses 1 to 4, wherein the ferrule thread includes a discontinuous portion.

Clause 6. The fitting assembly according to any of clauses 1 to 5, wherein the discontinuous portion includes a break extending from a crest of the ferrule thread to the sidewall of the ferrule, wherein the break is configured to bite into the flexible duct to prevent unthreading of the flexible duct from the ferrule thread.

Clause 7. The fitting assembly according to any of clauses 1 to 6, wherein the discontinuous portion comprises a ramped surface extending from the sidewall of the ferrule to a crest of the ferrule thread.

Clause 8. The fitting assembly according to any of clauses 1 to 7, wherein the ferrule further comprises a circumferential depression for receiving a terminal end of the flexible duct.

Clause 9. The fitting assembly according to any of clauses 1 to 8, further comprising a clamp surrounding the circumferential depression and configured to clamp the flexible duct to the ferrule.

Clause 10. The fitting assembly according to any of clauses 1 to 9, wherein a taper of the sidewall of the ferrule is configured to stretch a sheet material of the flexible duct as the ferrule is threaded into the flexible duct.

Clause 11. The fitting assembly according to any of clauses 1 to 10, wherein a pitch of the ferrule thread is less than or equal to a pitch of a helix structure of the flexible duct with the flexible duct fully elongated.

Clause 12. The fitting assembly according to any of clauses 1 to 11, wherein an outer diameter of the ferrule thread is larger than an inner diameter of a helix structure of the flexible duct when a pitch of the ferrule thread is equal to a pitch of the helix structure.

Clause 13. The fitting assembly according to any of clauses 1 to 12, wherein the connection between the fitting and the ferrule is substantially air tight without application of a sealant material.

Clause 14. The fitting assembly according to any of clauses 1 to 13, further comprising a gasket or sealant material disposed at an interface of the fitting and the ferrule.

Clause 15. The fitting assembly according to any of clauses 1 to 14, wherein the fitting comprises at least one of an elbow, a tee, a wye, a manifold takeoff, a coupling, a terminal boot, a cap, a plug, a union, and a flange.

Clause 16. A ferrule for connecting to a flexible duct, the ferrule comprising: a sidewall defining a minor diameter and a major diameter spaced apart from the minor diameter; a ferrule thread extending radially outward from the sidewall; and at least one of: a tab configured to extend into a recess of a fitting, the tab configured to radially deflect and disengage from the recess of the fitting upon rotation of the ferrule relative to the fitting; and a recess configured to receive a tab of the fitting, the recess configured to radially deflect the tab of the fitting upon rotation of the ferrule relative to the fitting, wherein the minor diameter is less than or equal to an inner diameter of the flexible duct with the flexible duct in an untensioned state, and wherein the major diameter is greater than the inner diameter of the flexible duct with the flexible duct fully elongated.

Clause 17. The ferrule according to clause 16, wherein engagement of the tab with the recess of the fitting limits rotation of the ferrule relative to the fitting about the a longitudinal axis of the ferrule and the fitting when a rotational force applied to the ferrule relative to the fitting is less than a force required to radially deflect the tab.

Clause 18. The ferrule according to clause 16 or 17, wherein the ferrule thread includes a discontinuous portion.

Clause 19. The ferrule according to any of clauses 16 to 18, wherein the discontinuous portion includes a break extending from a crest of the ferrule thread to the sidewall, wherein the break is configured to bite into the flexible duct to prevent unthreading of the flexible duct from the ferrule thread.

Clause 20. The ferrule according to any of clauses 16 to 19, wherein the discontinuous portion comprises a ramped surface extending from the sidewall to a crest of the ferrule thread.

Clause 21. The ferrule according to any of clauses 16 to 20, further comprising a circumferential depression for receiving a terminal end of the flexible duct.

Clause 22. The ferrule according to any of clauses 16 to 21, wherein a taper of the sidewall is configured to stretch a sheet material of the flexible duct as the flexible duct is threaded onto the ferrule thread.

Clause 23. The ferrule according to any of clauses 16 to 22, wherein a pitch of the ferrule thread is less than a pitch of a helix structure of the flexible duct with the flexible duct fully elongated.

Clause 24. The ferrule according to any of clauses 16 to 23, wherein an outer diameter of the ferrule thread is larger than an inner diameter of a helix structure of the flexible duct when a pitch of the ferrule thread is equal to a pitch of the helix structure.

Clause 25. A ductwork assembly comprising: a duct having a helix structure and a flexible sheet material surrounding the helix structure; and a ferrule comprising: a sidewall defining a minor diameter and a major diameter spaced apart from the minor diameter; a ferrule thread extending radially outward from the sidewall; and at least one of: a tab configured to extend into a recess of a fitting, the tab configured to radially deflect and disengage from the recess of the fitting upon rotation of the ferrule relative to the fitting; and a recess configured to receive a tab of the fitting, the recess configured to radially deflect the tab of the fitting upon rotation of the ferrule relative to the fitting, wherein the minor diameter is less than or equal to an inner diameter of the flexible duct with the flexible duct in an untensioned state, and wherein the major diameter is greater than the inner diameter of the flexible duct with the flexible duct fully elongated, wherein the helix structure of the duct is threaded over the ferrule thread such that the flexible sheet material of the duct is stretched radially outward by the sidewall of the ferrule.

Clause 26. The ductwork assembly according to clause 25, further comprising: a fitting removably connected to the ferrule, wherein the fitting comprises at least one of an elbow, a tee, a wye, a manifold takeoff, a coupling, a terminal boot, a cap, a plug, a union, and a flange.

Further details and advantages of the present disclosure will be understood from the following detailed description read in conjunction with the accompanying drawings.

DETAILED DESCRIPTION

Figure 1:
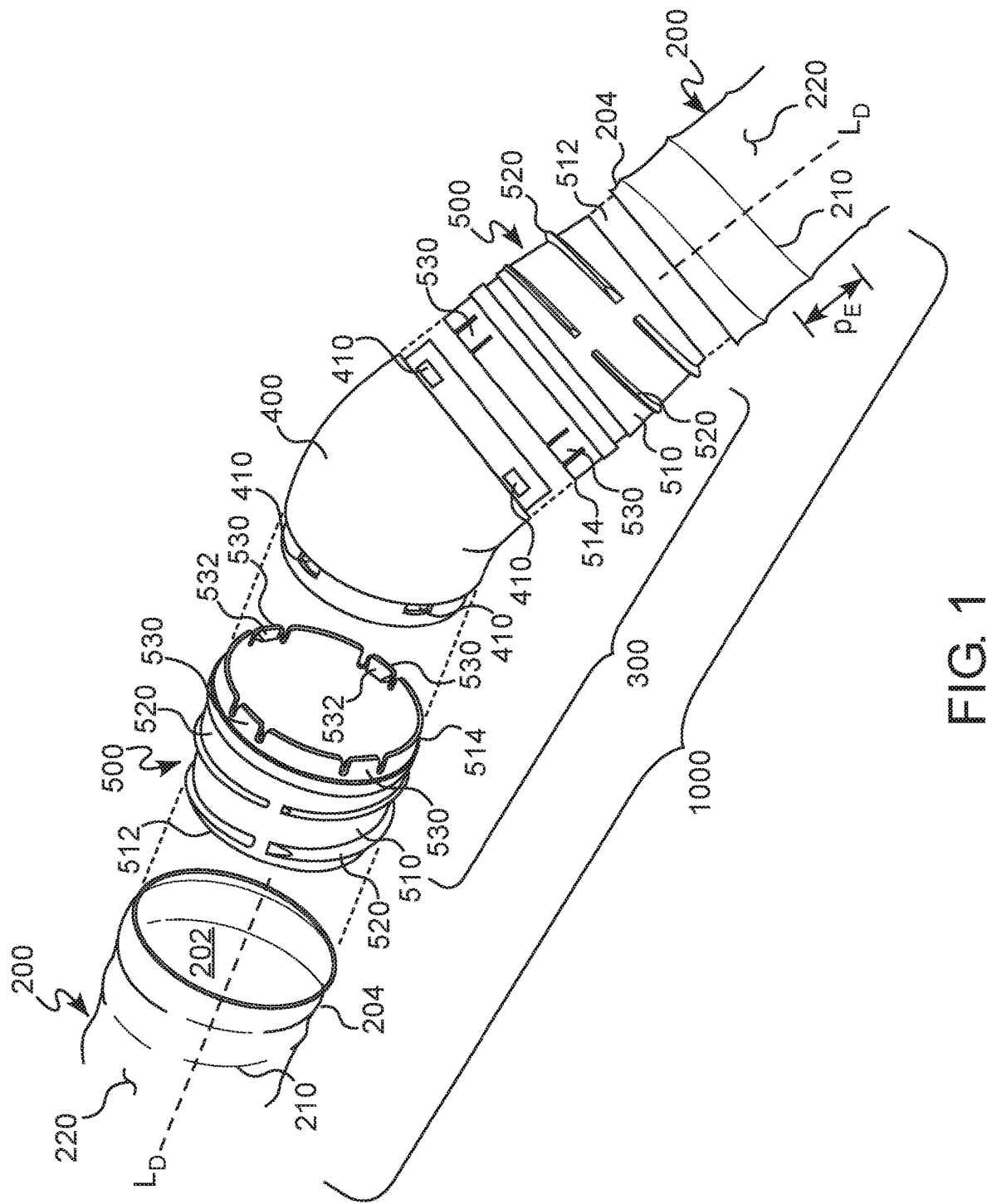
FIG. 1 is an exploded perspective view of a ductwork assembly in accordance with embodiments of the present disclosure.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

All numbers used in the specification and claims are to be understood as being modified in all instances by the term "about". The terms "approximately", "about", and "substantially" mean a range of plus or minus ten percent of the stated value. Ranges of values are to be understood as being inclusive unless specified to the contrary.

As used herein, the term "at least one of" is synonymous with "one or more of". For example, the phrase "at least one of A, B, and C" means any one of A, B, and C, or any combination of any two or more of A, B, and C. For example, "at least one of A, B, and C" includes one or more of A alone; or one or more of B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of". For example, the phrase "at least two of D, E, and F" means any combination of any two or more of D, E, and F. For example, "at least two of D, E, and F" includes one or more of D and one or more of E; or one or more of D and one or more of F; or one or more of E and one or more of F; or one or more of all of D, E, and F.

As used herein, the term "flexible duct" means a non-rigid, elongate hollow structure suitable for the conveyance of fluid such as air. As will be described in greater detail herein, embodiments of the flexible duct may be radially and/or axially deformable. The flexible duct may be transitionable between several physical states in response to axial and/or radial loading. A relaxed or natural state of the flexible duct refers to a state assumed by the flexible duct when no axial or radial load is applied. An elongated, tensioned, or pretensioned state of the flexible duct refers to a state in which at least a portion of the duct is axially extended to be longer than the relaxed state. The elongated, tensioned, or pretensioned state may be assumed by the flexible duct in response to an axial and/or radial load. A compressed state of the flexible duct refers to a state in which at least a portion of the duct is axially compressed to be shorter than the relaxed state. The compressed state may be assumed by the flexible duct in response to an axial and/or radial load. In some embodiments, the relaxed or natural state of the flexible duct may also correspond to the maximum extended length of the flexible duct, in which case the elongated state of the flexible duct would be the same as the natural state. In some embodiments, the flexible duct may be in the elongated, tensioned, or pretensioned state when the flexible duct is installed in a ductwork system. The flexible duct may be un-insulated, or have a thermally insulating layer surrounding the inner air conduit.

As used herein, the terms "air tight" and "substantially air tight", when used to define an interface or connection between two or more members, means that a total volume of air that leaks from the interface in one hour is less than 20 times the volume of a test sample which includes 8 feet of duct connected to the interface and pressurized to 124.5 Pa.

Referring now to the drawings, in which like reference characters refer to like parts throughout the several views thereof, various embodiments of a fitting assembly, a ferrule, and a ductwork assembly are shown. Referring now to FIG. 1, a ductwork assembly 1000 is illustrated which includes at least one flexible duct 200 connected to a fitting assembly 300 which includes a fitting 400 and at least one ferrule 500. The fitting assembly 300 may be used to join sections of flexible duct 200 in the ductwork assembly 1000. The ductwork assembly 1000 may form a part of a residential or commercial HVAC system or other fluid distribution system. For example, the ductwork assembly 1000 may convey air from a furnace, heat pump, or air conditioner to a register. The ductwork assembly 1000 shown in FIG. 1 is only a portion of an HVAC system which may include a plurality of flexible ducts 200, fitting assemblies 300, and other components such as registers, furnaces, heat pumps, air conditioners, humidifiers, fans, other air-consuming appliances, and the like. Additional details of an HVAC system in which the ductwork assembly 1000 may be utilized is described in International Patent Application Publication No. WO 2018/004768, the disclosure of which is hereby incorporated by reference in its entirety.

As may be appreciated from FIG. 1, the flexible duct 200 extends along a longitudinal axis $L_D$ and defines a hollow interior 202 suitable for the conveyance of fluid such as air. In particular, a sidewall of the flexible duct 200 is formed of a flexible sheet material 220 which extends along the longitudinal axis $L_D$ and surrounds the hollow interior 202. The flexible duct 200 may have a generally circular in cross section and, at least in the relaxed state, has substantially continuous inner and outer diameters along the longitudinal axis $L_D$. In some embodiments, the flexible duct 200 includes a resilient helix structure 210 embedded in, surrounding, or surrounded by the flexible sheet material 220. In the embodiment shown in the drawings, the helix structure 210 includes a helical wire. In other embodiments, the helix structure 210 may include a helical crimp extended around an outer surface of the flexible sheet material 220 and crimping or pinching a portion of the flexible sheet material 220 along the path of the helical crimp. In some embodiments, the flexible duct 200 may include multiple helix structures 210, though for the purposes of this disclosure a single helix structure 210 will be assumed for simplicity. The helix structure 210 is resiliently deformable and includes a plurality of continuous windings or revolutions.

Figure 2:
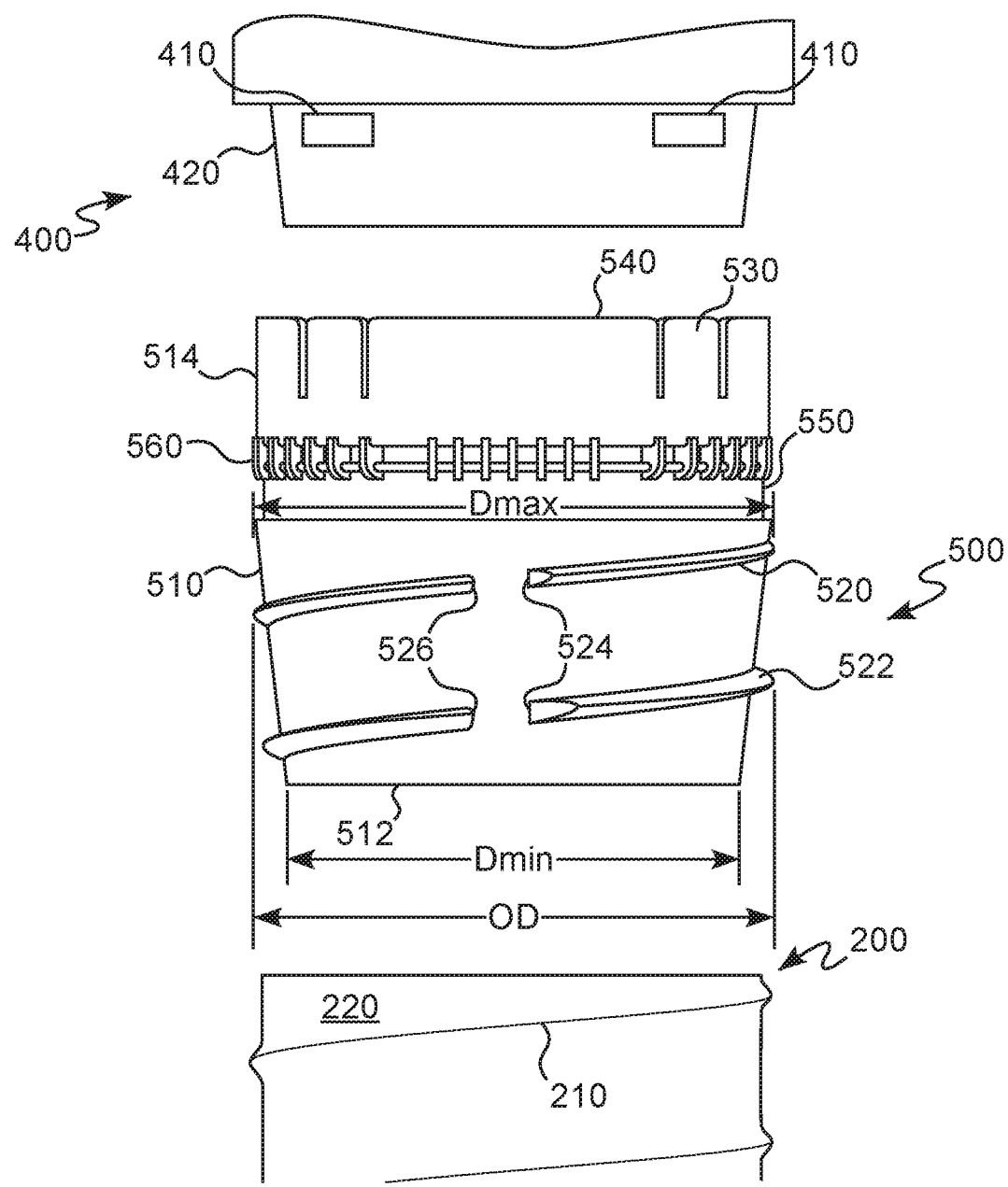
FIG. 2 is an exploded side view of the ductwork assembly of FIG. 1.
Figure 3:
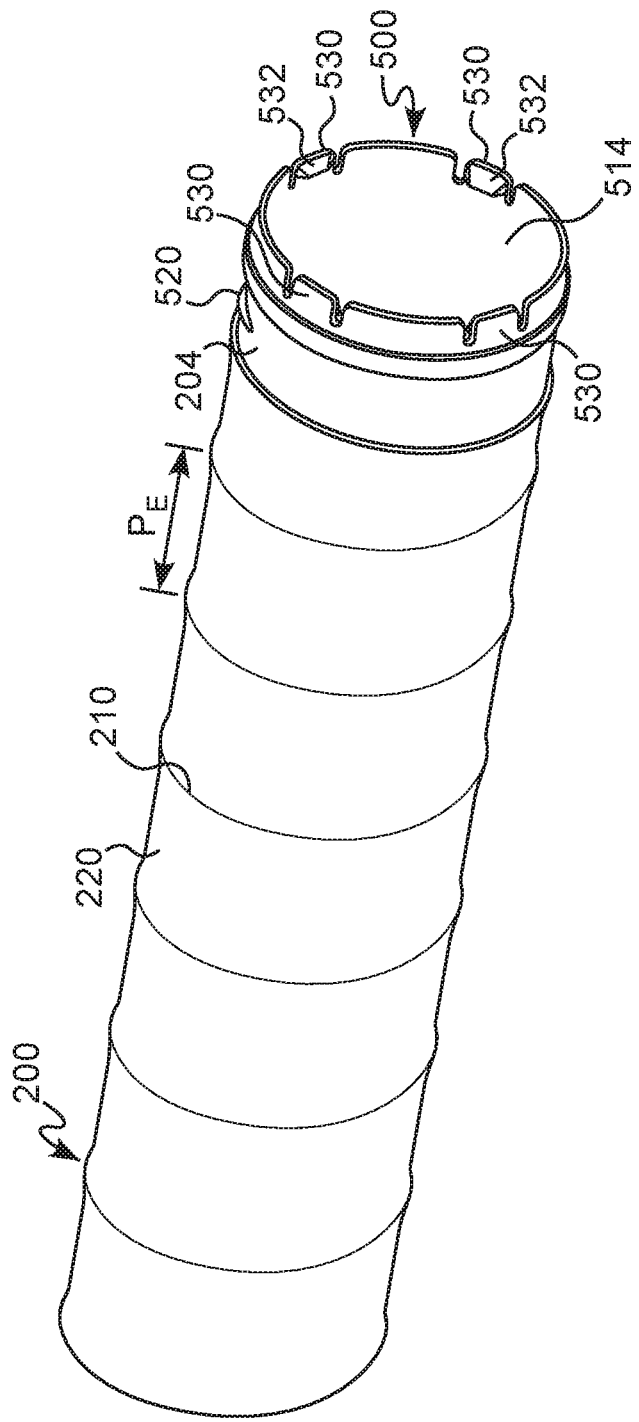
FIG. 3 is a perspective view of a ferrule and a flexible duct in accordance with embodiments of the present disclosure.

With continued reference to FIG. 1 and further reference to FIGS. 2 and 3, the fitting assembly 300 includes a ferrule 500 having a sidewall 510 which connects to a terminal end 204 of the flexible duct 200. With the flexible duct 200 connected to the ferrule 500, the ferrule shares and is coaxial with the longitudinal axis $L_D$ of the flexible duct 200. The sidewall 510 of the ferrule extends from a first end 512 of the ferrule 500 configured for insertion into the flexible duct 200 to a second end 514 of the ferrule 500 configured for connection to the fitting 400. The sidewall 510 has a radially increasing taper from the first end 512 of the ferrule 500 to the second end 514 of the ferrule 500, such that the sidewall 510 defines a minor diameter $D_{min}$ adjacent the first end 512 of the ferrule 500 and a major diameter $D_{maj}$ axially spaced apart from the minor diameter $D_{min}$ along the sidewall 510. The ferrule 500 thus forms a frustoconical structure between the minor and major diameters $D_{min}$, $D_{maj}$ thereof.

The ferrule 500 further includes at least one thread 520 extending radially from the sidewall 510. In some embodiments, the at least one thread 520 may extend for at least one revolution around the sidewall 510 of the ferrule 500. The at least one thread 520 is configured to engage the flexible duct 200 to retain the flexible duct 200 on the ferrule 500. The engagement of the ferrule 500 with the flexible duct 200 will now be described with reference to FIG. 4. As noted herein, the flexible duct 200 may be transitionable between a natural state, an elongated state, and a compressed state. More particularly, the helix structure 210 may be resilient such that radial and/or axial loading applied to the helix structure 210 induces the flexible duct 200 to assume either the elongated or compressed state, depending on the direction of the applied load. In the elongated state, the distance between adjacent windings of the helix structure 210 may be defined by an elongated pitch $P_E$, whereas, in the compressed state, the distance between adjacent windings of the helix structure 210 may be defined by a compressed pitch $P_C$ which is less than the elongated pitch $P_E$. An example of a radial load capable of inducing the compressed state is a load applied on the helix structure 210 by sliding the helix structure 210 over a conical structure having a greater diameter than the helix structure 210. This radial loading causes the individual windings of the helix structure 210 to expand in diameter and also causes the helix structure 210 to compress along the longitudinal axis $L_D$, thereby reducing the distance between adjacent windings relative to the elongated state. The helix structure 210 is resilient in that the helix structure 210 returns to the natural state upon removal of the load that induced the elongated or compressed state.

To engage the ferrule 500 with the terminal end 204 of the flexible duct 200, the helix structure 210 is threaded onto the at least one thread 520 of the ferrule 500 by rotating the flexible duct 200 relative to the ferrule, or vice versa. The helix structure 210 engages the at least one thread 520 to advance the flexible duct towards the second end 514 of the ferrule 500 as the flexible duct is rotated relative to the ferrule 500. More particularly, the at least one thread 520 engages and radially stretches the flexible sheet material 220 as the helix structure 210 rides along a shank 522 of the thread 520. The minor diameter $D_{min}$ of the sidewall 510 is less than an inner diameter of the flexible duct 200, such that the helix structure 210 fits around the first end 512 of the ferrule 500 without being radially deformed by the sidewall 510. The major diameter $D_{maj}$ of the sidewall 510 is greater than the inner diameter of the flexible duct 200, such that as the flexible duct 200 is threaded onto the ferrule 500 toward the second end 514, the sidewall 510 forces the helix structure 210 to radially expand. Consequently, a portion of the helix structure 210 forced to radially expand assumes the compressed state and the compressed pitch $P_C$, whereas a portion of the helix structure 210 that fits over the sidewall 510 without being radially deformed maintains the elongated state and the elongated pitch $P_E$. The flexible duct 200 may be threaded onto the ferrule 500 such that at least one revolution or winding of the helix structure 210 engages and is deformed by the sidewall 510 of the ferrule. Threading the flexible duct 200 onto the ferrule 500 may be performed by hand such that a user can rapidly and securely assemble the ductwork assembly 1000 without the need for specialized tools or advanced training.

The radial load applied to the flexible duct 200 by the ferrule 500 results in an interference fit between the ferrule 500 and the flexible duct 200, causing the flexible duct 200 to be retained on the ferrule 500. In some embodiments, the interference fit may be sufficient to withstand an axial pullout force of 25 pounds. Thus, the interference fit between the ferrule 500 and the flexible duct 200 may be sufficient to secure the flexible duct 200 to the ferrule 500 in the completed, operational ductwork assembly 1000. In some embodiments, an adhesive may be applied between the flexible duct 200 and the ferrule 500 to assist in securing the flexible duct 200 to the ferrule 500. In some embodiments, the interface between the ferrule 500 and the flexible duct 200 is air tight, such that additional sealing components or materials such as clamps, fasteners, gaskets, mastics, and/or sealants need not be applied to the interface. In other embodiments, one or more of such sealing components or materials may be applied to the interface between the ferrule 500 and the flexible duct 200.

Figure 5:
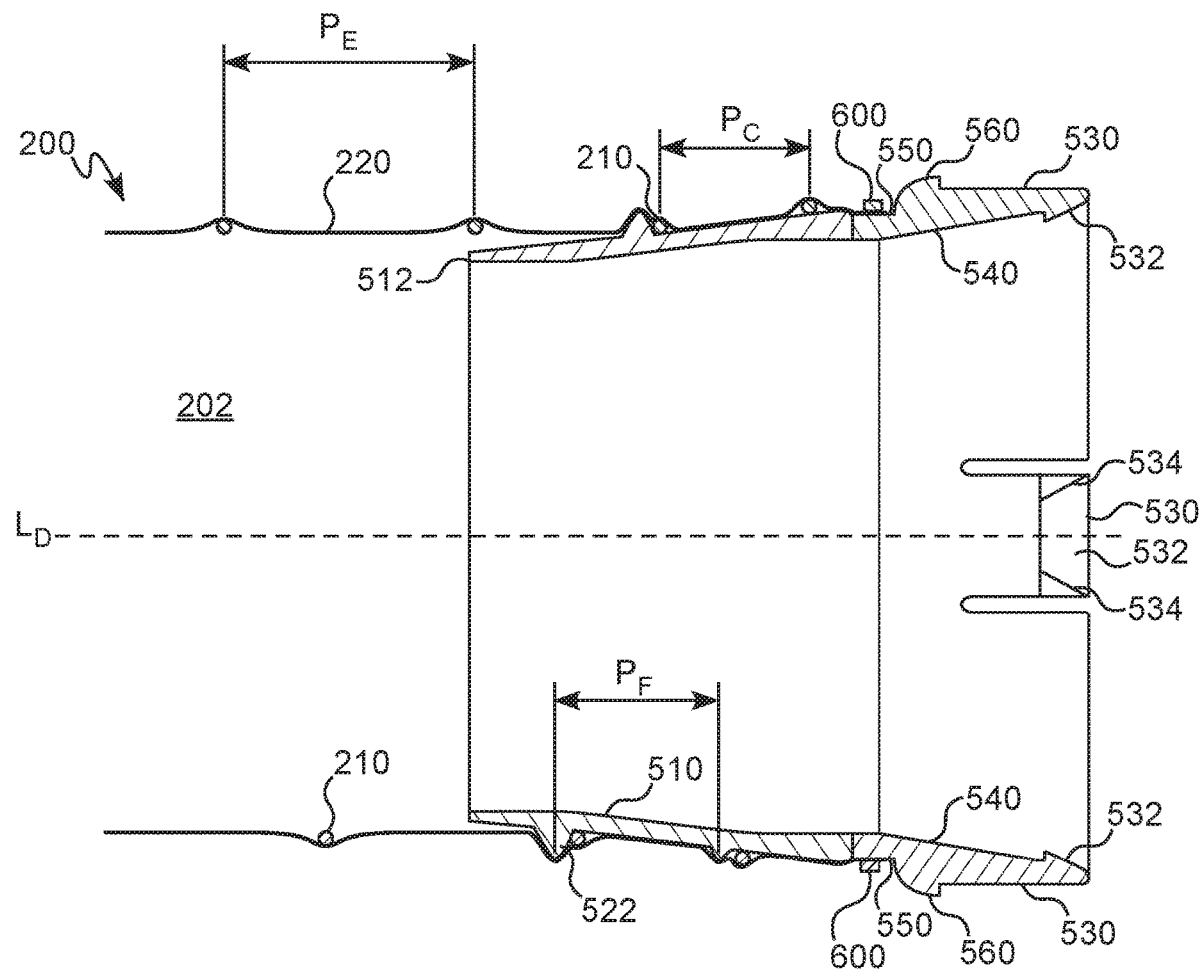
FIG. 5 is a side cross-sectional view of the ferrule and the flexible duct of FIG. 3.

With continued reference to FIGS. 2 and 5, a pitch $P_F$ defined by the spacing between adjacent windings of the at least one thread 520 of the ferrule 500 may be equal to or less than a pitch of the helix structure 210. In some embodiments, the pitch $P_F$ may be approximately equal to the compressed pitch $P_C$ of the helix structure 210, to facilitate a tight connection between the at least one thread 520 and the portion of the helix structure 210 in the compressed state. An outer diameter OD of the at least one thread 520 may be greater than the inner diameter of the flexible duct 200 with the flexible duct 200 installed on the ferrule 500. As such, the at least one thread 520 may engage the flexible duct 200 even in the vicinity of the minor diameter $D_{min}$ of the sidewall 510 where the sidewall 510 does not engage the flexible duct 200. In particular, the outer diameter OD may be larger than an inner diameter of the helix structure 210 when the pitch $P_F$ of the at least one thread 520 is equal to a compressed pitch $P_C$ with the helix structure 210 engaging the sidewall 510 of the ferrule 500. As such, the helix structure 210 is prevented from compressing further due to abutment of the helix structure with the at least one thread 520, thereby preventing radial expansion of the helix structure 210 and preventing the helix structure 210 from being able to jump the at least one thread 520.

In some embodiments, the outer diameter OD of the at least one thread 520 may be substantially constant along the length of the sidewall 510. In order that the outer diameter OD of the at least one thread 520 may be substantially constant despite the tapering of the sidewall 510, the flank 522 of the at least one thread 520 may be longer towards the first end 512 of the ferrule 500 and shorter towards the second end 514 of the ferrule 500.

In some embodiments, the at least one thread 520 may extend for at least one revolution, at least two revolutions, or more revolutions around the sidewall 510. In some embodiments, the flexible duct 200 may be threaded onto the ferrule 500 so as to engage the entirety of the at least one thread 520, while in other embodiments the flexible duct 200 may be threaded onto the ferrule 500 so as to engage only a portion of the at least one thread 520. The number of revolutions of the at least one thread, the outer diameter OD of the at least one thread, and the degree to which the flexible duct 200 engages the at least one thread 520 may be selected to achieve a desired pullout resistance of the ferrule 500. For example, the desired pullout resistance may be 25 pounds-force.

With continued reference to FIG. 2, in some embodiments, the at least one thread 520 may include a discontinuous section at which the shank 522 does extend from the sidewall 510 of the ferrule 500, or at which the height of the shank 522 is reduced relative to adjacent portions of the at least one thread 520. A first end of the discontinuous portion of the at least one thread 520 may include a break 526 extending from a crest of the at least one thread 520 to the sidewall 510. The break 526 may extend substantially perpendicular to the sidewall 510. The flexible duct 200 freely passes over the break 526 as the flexible duct 200 is threaded onto the ferrule 500. However, if the flexible duct 200 attempts to unthread itself from the ferrule 550, the break 526 snags and bites into the flexible sheet material 220 to resist unthreading of the flexible duct 200. A second end of the discontinuous portion may include a ramped surface 524 extending at an angle from the sidewall 510 to the crest of the at least one thread 520. The ramped surface 524 may in particular be angled to prevent snagging of the flexible sheet material 220 as the flexible duct 200 is threaded onto the ferrule 500 over the discontinuous portion. As shown in FIG. 2, the at least one thread 520 may include multiple discontinuous sections to increase the resistance to unthreading of the flexible duct 200.

While the connection between the flexible duct 200 and the ferrule 500 has been described herein with reference to a flexible duct 200 including the helix structure 210, it is to be understood that the ferrule 500 may also be connected to a flexible duct 200 lacking a helix structure 210. In such embodiments, the at least one thread 520 of the ferrule 500 engages the flexible sheet material 220 to radially expand the flexible sheet material 220. Circumferential tension thereby generated in the flexible sheet material 220, along with friction between the flexible sheet material 220 and the sidewall 510, secure the flexible duct to the ferrule 500.

Figure 6:
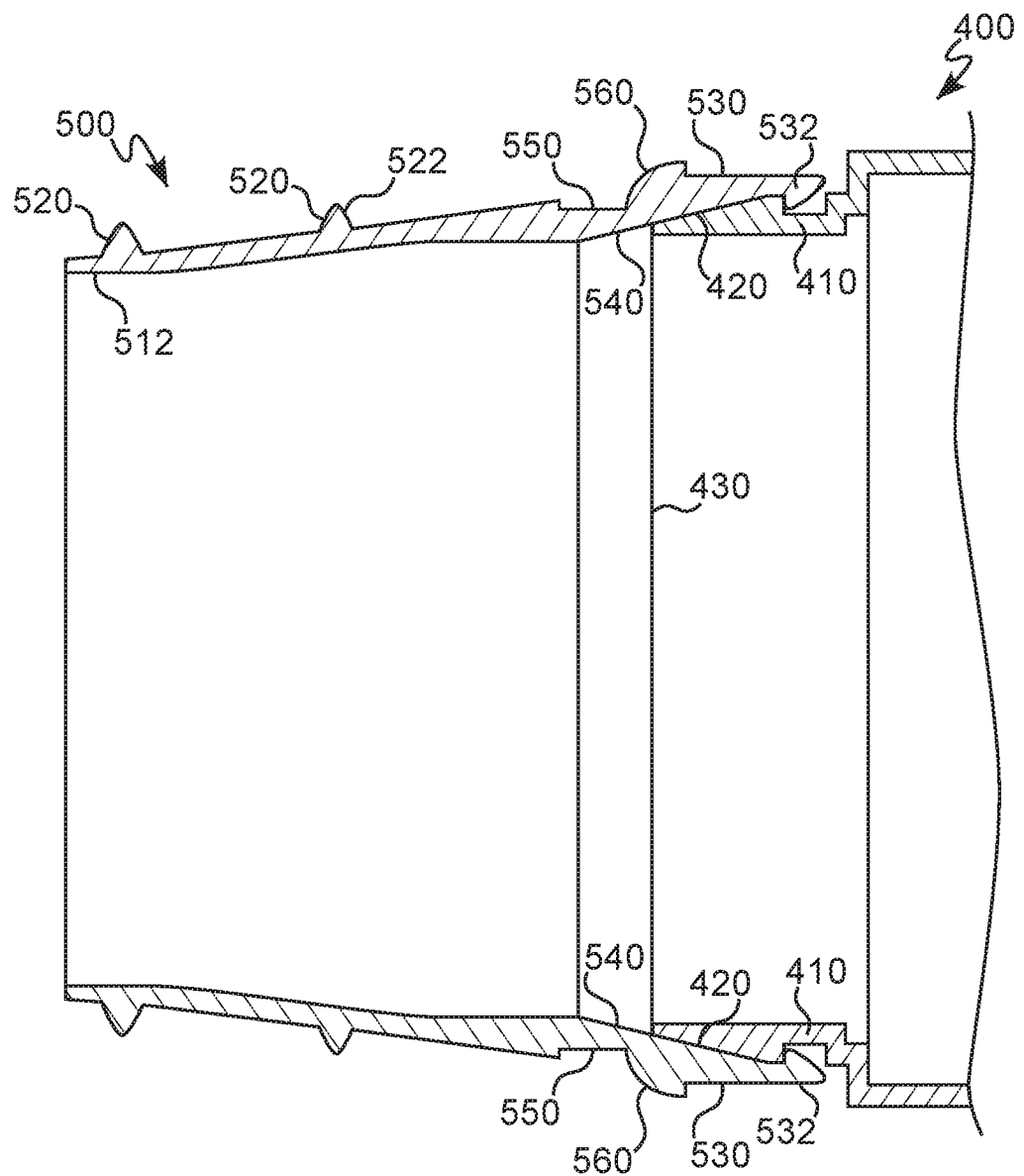
FIG. 6 is a side cross-sectional side view of a fitting assembly in accordance with embodiments of the present disclosure.

Referring now to FIGS. 1, 2, and 6, the fitting assembly 300 may include a fitting 400 connected to the ferrule 500. The fitting 400 may be, or may include, any type of component of an HVAC system such as an elbow, a tee, a manifold takeoff, a coupling, a terminal boot, a cap, a plug, a union, or a flange. As shown in FIGS. 1, 2, and 6, the fitting 400 may define one or more recesses 410 for receiving one or more tabs 530 formed on and/or extending from the second end 514 of the ferrule 500. In some embodiments, each of the one or more recesses 410 may be in the form of a through hole extending entirely through a sidewall of the ferrule 500. In some embodiments each of the one or more recesses 410 may be in the form of a blind hole extending only partially through the sidewall of the ferrule 500.

Each tab 530 of the ferrule 500 may be radially deflectable and may include a projection or tooth 532 that snaps into one of the recesses 410 of the fitting. In some embodiments, the one or more tabs 530 may be evenly spaced around the circumference of the ferrule 500, while the one or more recesses 410 may be evenly spaced around the circumference of the fitting 400 such that each tab 530 aligns with one of the recesses 410. The snap fit between the fitting 400 and the ferrule 500 allows the connection of the fitting 400 and the ferrule 500 to be performed by hand so that the user can rapidly and securely assemble the fitting assembly 300 without the need for specialized tools or advanced training.

Figure 4:
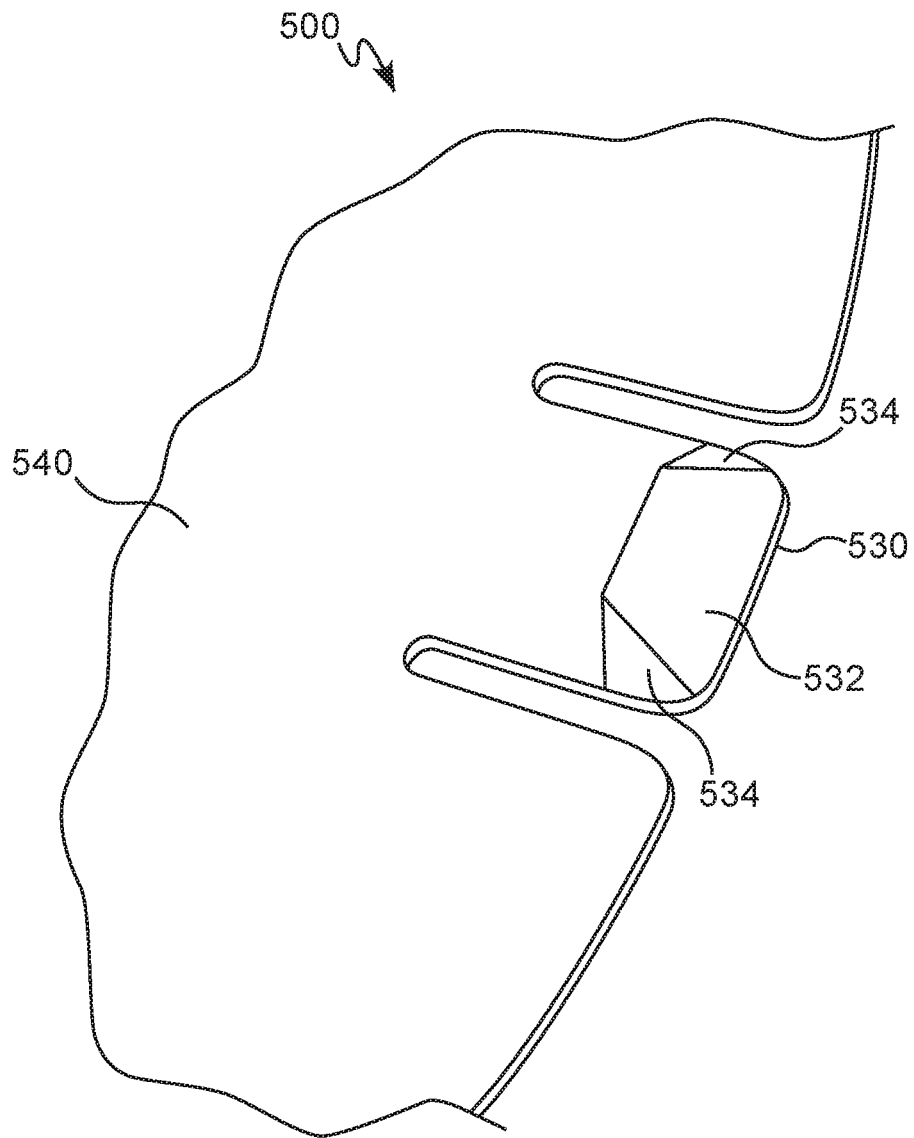
FIG. 4 is a detail perspective view of a tab of the ferrule of FIG. 3.

Additional details of the one or more tabs 530 of the ferrule are shown with reference to FIG. 4. The tooth 532 may extend radially inward from an inner surface 540 of the ferrule 500. In some embodiments, the tooth 532 may include one or more ramped surfaces 534 sloping in a circumferential direction of the ferrule 500 that assist in assembly and disassembly of the fitting assembly 300. During assembly, the one or more ramped surfaces 534 may help guide the tooth 532 into alignment with the corresponding recess 410 as the ramped surface 534 engages an edge 412 of the recess 410. During disassembly, the user may rotate the ferrule 500 relative to the fitting 400, causing the ramped surface 534 to slide over an edge 412 of the recess 410 and thereby deflect the tab 530 radially outward. If sufficient rotational force is applied, the tooth 532 may be entirely dislodged from the recess 410, allowing the user to separate the fitting 400 from the ferrule 500 by pulling along the longitudinal axis $L_D$.

Each of the one or more recesses 410 may have a width extending in the circumferential direction of the fitting 400 equal to or greater than a width of the tooth 532 of the corresponding tab 530. If the width of the recess 410 is substantially equal to width of the tooth 532, rotation of the fitting 400 relative to the ferrule 500 is prevented by abutment of the tooth 532 against the edges of the recess 410. However, if a sufficient rotational force is applied to the fitting 400 and/or the ferrule 500, the ramped surface 534 may slide over the edge 412 of the recess 410 and become dislodged, as described herein. Therefore, the angle of slope of the ramped surfaces 534 may be selected such that rotational force required to dislodge the tooth 532 from the recess 410 is not less than incidental forces that might be experienced by ferrule 500 and fitting 400 in service, but is not greater than a force that can readily be applied by the user (either manually or with the assistance of tools) when intentionally dislodging the tooth 532 from the recess 410.

In some embodiments, the width of the recess 410 may be greater than the width of the tooth 532, such that the ferrule 500 may be rotated by some amount less than 360° relative to the fitting 400 before the tooth 532 abuts the edge 412 of the recess 210. As such, there may be controlled and limited rotational freedom between the ferrule 500 and the fitting 400.

In the embodiments shown in the accompanying drawings, the one or more tabs 530 are disposed on the ferrule 500 and the one or more recesses 410 are defined in the fitting 400. In other embodiments, the one or more tabs 530 may be disposed on the fitting 400 and the one or more recesses 410 may be defined in the ferrule 500. In some embodiments, the tooth 532 of each of the one or more tabs 530 may extend radially outward, rather than radially inward as shown in the drawings. In such embodiments, the one or more recesses 410 may be provided on an inner surface of the fitting 400 or the ferrule 500 to receive the outwardly projecting tooth 532.

In the embodiments shown in the accompanying drawings, the ramped surfaces 534 are provided on the tooth 532 of each tab 530 and the edges 412 are defined at the perimeter of each recess 410 to facilitate assembly and disassembly of the fitting assembly 300. In other embodiments, the one or more recesses 410 may include ramped surfaces which engage an edge of the tooth 532 to facilitate assembly and disassembly of the fitting assembly 300.

With the fitting 400 and the ferrule 500 connected via the engagement of the one or more tabs 530 with the one or more recesses 540, the interface between the ferrule 500 and the fitting 400 may form an air tight connection. With reference to FIGS. 2, 5, and 6, a portion of the inner surface 540 of the ferrule 500 may be conically shaped to engage a conically-shaped outer surface 420 of the fitting 400. The conical portions of the inner surface 540 of the ferrule 500 and the outer surface 420 of the fitting 400 may have a taper of, for example, between 0.1° and 10°. In other embodiments, the inner surface 540 of the ferrule 500 and the outer surface 420 of the fitting 400 may be spherically shaped. The inner surface 540 of the ferrule 500 and the outer surface 420 of the fitting 400 may engage with an interference fit when the ferrule 500 and the fitting 400 are assembled to create the air tight seal.

As the interface between the ferrule 500 and the fitting 400 may be air tight, the need for additional sealing components such as clams, fasteners, gaskets, mastics, and/or sealants may be eliminated. In other embodiments, one or more of such sealing components may be applied to the interface between the ferrule 500 and the fitting 400.

With continued reference to FIGS. 2, 5, and 6, in some embodiments, a depression 550 may extend around the circumference of the ferrule 500. The depression 550 may have a diameter less than the major diameter $D_{maj}$ of the sidewall 510. The depression 550 may be configured to receive the terminal end 204 of the flexible duct 200 as the flexible duct is threaded onto the at least one thread 520. Once the terminal end 204 of the flexible duct 200 is received in the depression 550, a clamp 600 may be fastened around the depression 550 to secures the flexible duct 200 to the ferrule 500. The clamp 600 may be, for example, a cable clamp, hose clamp, zip tie, cable tie, or the like. The clamp 600 prevents inadvertent unthreading to the flexible duct 200 from the ferrule 500.

With continued reference to FIGS. 2, 5, and 6, in some embodiments, the ferrule 500 may include a grip 560 for assisting the user in grasping the ferrule 500 during connection of the ferrule 500 to the flexible duct 200, and during assembly and disassembly of the fitting assembly 300. The grip 560 may include, in some embodiments, a plurality of ribs extending radially from the ferrule 500. In some embodiments the grip 560 may include a plurality of tabs extending from opposing sides of the ferrule 500, similar to a wing nut. The grip 560 may be configured to prevent slippage of the ferrule 500 in the user's hand when a rotational force, such as that applied to disconnect the ferrule 500 from the fitting 400, is imparted to the ferrule 500.

Referring again to FIGS. 1-6, the components of the ductwork assembly 1000, including the flexible duct 200, the fitting 400, and the ferrule 500, may be manufactured from materials that are generally heat insulators to maintain the temperature of air conveyed through the ductwork assembly 1000. The helix structure 210 of the flexible duct 200 may be manufactured from steel or a similar resilient, shape memory material capable of supporting the shape of the flexible sheet material 220 and able to withstand deformation as the flexible duct 200 is connected to the ferrule 500. The flexible sheet material 220 may be manufactured from a resilient material, such as a thin-wall polyvinyl chloride (PVC) or polyurethane foam, so that the flexible sheet material 220 can deform against the at least one thread 520 and the sidewall of the ferrule 500. The flexible sheet material 220 may have a thickness, for example, of less than 0.25 inches or of less than 0.5 inches. The fitting 400 and the ferrule 500 may be manufactured from one or more materials including but not limited to: plastic, such as PVC or acrylonitrile butadiene styrene (ABS); composite materials such as a fiber-reinforced polymer; metal; or non-combustible material.

Sizing of the components of the ductwork assembly 1000 may be selected based on the desired air flow rate within the ductwork assembly 1000. The flexible duct 200 is typically manufactured in a variety of nominal sizes that dictate the sizing of the fitting 400 and the ferrule 500. In particular, the major and minor diameters $D_{maj}$, $D_{min}$ of the ferrule 500 may be based on the diameter of the flexible duct 200 to facilitate proper engagement of the ferrule 500 and the flexible duct 200, as discussed herein with reference to FIG. 4. In some embodiments, the major diameter $D_{maj}$ may be in a range of 1 percent to 20 percent greater than the inner diameter of the flexible duct 200. In some embodiments, the minor diameter $D_{min}$ may be in a range of 0 percent to 20 percent less than the inner diameter of the flexible duct 200. In some embodiments, the taper of the sidewall 510 between the major and minor diameters $D_{maj}$, $D_{min}$ of the ferrule 500 may be in the range of 0.5 to 15 degrees. In some embodiments, the maximum height of the at least one thread 520 of the ferrule 500 may be in the range of 2 millimeters (mm) and 6 mm. In some embodiments, the length of the sidewall 510 between the major and minor diameters $D_{maj}$, $D_{min}$ of the ferrule 500 may be in the range of 35 mm to 80 mm. In some embodiments, the pitch $P_F$ of the at least one thread 520 of the ferrule 500 may be in the range of 13 mm to 36 mm. It is to be understood that the foregoing values and ranges of values for sizing the components of the ductwork assembly 1000 are presented only for exemplary purposes and are not to be construed as limiting.

The present disclosure is further directed to a method of assembling the ductwork assembly 1000. The manner in which the flexible duct 200, the fitting 400, and the ferrule 500 are connected to one another is generally described herein in the context of the structural features of the various components. In particular, connection of the flexible duct 200 to the ferrule 500 is described in connection with at least FIG. 5, and connection of the fitting 400 and the ferrule 500 is described herein in connection with at least FIGS. 5 and 6. A method of assembling the ductwork assembly 1000 may include connecting the flexible duct 200 to the ferrule 500, and connecting the ferrule 500 to the fitting 400. The method may further include repeatedly making connections of additional flexible ducts 200, fittings 400, and ferrules 500 until the entire ductwork assembly 1000 is completed. For example, the method may include repeatedly making connections of additional flexible ducts 200, fittings 400, and ferrules 500 to achieve an HVAC system as generally described in International Patent Application Publication No. WO 2018/004768, the disclosure of which is hereby incorporated by reference in its entirety. In general, the order of making the connections does not matter due to the rotatable nature of the ferrule 500 relative to the fitting 400. However, the specific layout of the ductwork assembly 1000 may be more conducive to connecting the ferrule 500 to the flexible tubing 200 prior to connecting the ferrule to the fitting 400, or vice versa. Additionally, in embodiments in which the fitting 400 is not rotatable relative to the ferrule 500 after connection is made, it may be necessary to connect the ferrules 500 at both terminal ends 204 of the flexible tube 200 prior to connecting the ferrules 500 to the fittings 400. Otherwise, threading the flexible duct 200 onto the second ferrule 500 may cause the flexible duct 200 to be unthreaded from the first ferrule 500.

While several embodiments of a fitting assembly, a ferrule, and a ductwork assembly are shown in the accompanying figures and described hereinabove in detail, other embodiments will be apparent to, and readily made by, those skilled in the art without departing from the scope and spirit of the invention. For example, it is to be understood that this disclosure contemplates, to the extent possible, that one or more features of any embodiment can be combined with one or more features of any other embodiment. Accordingly, the foregoing description is intended to be illustrative rather than restrictive.

What is claimed is:

1. A fitting assembly for connection to a flexible duct, the fitting assembly comprising:
   a ferrule configured for insertion into an open end of the flexible duct, the ferrule comprising:
      a sidewall defining a minor diameter and a major diameter spaced apart from the minor diameter; and
      a ferrule thread extending radially outward from the sidewall;
   a fitting removably connected to the ferrule,
   wherein the minor diameter is less than or equal to an inner diameter of the flexible duct with the flexible duct in an untensioned state,
   wherein the major diameter is greater than the inner diameter of the flexible duct with the flexible duct fully elongated,
   wherein the fitting defines a recess,
   wherein a second end of the ferrule comprises multiple tabs configured to extend into the recess,
   wherein the recess comprises an edge, and
   wherein the second end of the ferrule comprises the multiple tabs with each tab comprising a ramped surface extending in a circumferential direction of the ferrule, such that rotation of the ferrule relative to the fitting causes the ramped surface to engage the edge, thereby radially deflecting the tabs and disengaging the tabs from the recess.

2. The fitting assembly according to claim 1, wherein the recess is formed in an external surface of the fitting.

3. The fitting assembly according to claim 1, wherein engagement of the tabs and the recess limits rotation of the ferrule relative to the fitting about the a longitudinal axis of the ferrule and the fitting when a rotational force applied to the ferrule relative to the fitting is less than a force required to radially deflect the tabs.

4. The fitting assembly according to claim 1, wherein the ferrule comprises a grip for assisting a user in grasping the ferrule during at least one of:
connection of the ferrule to the flexible duct; and
connection of the ferrule to the fitting.

5. The fitting assembly according to claim 1, wherein the ferrule thread includes a discontinuous portion.

6. The fitting assembly according to claim 5, wherein the discontinuous portion includes a break extending from a crest of the ferrule thread to the sidewall of the ferrule, wherein the break is configured to bite into the flexible duct to prevent unthreading of the flexible duct from the ferrule thread.

7. The fitting assembly according to claim 5, wherein the discontinuous portion comprises a ramped surface extending from the sidewall of the ferrule to a crest of the ferrule thread.

8. The fitting assembly according to claim 1, wherein the ferrule further comprises a circumferential depression for receiving a terminal end of the flexible duct.

9. The fitting assembly according to claim 8, further comprising a clamp surrounding the circumferential depression and configured to clamp the flexible duct to the ferrule.

10. The fitting assembly according to claim 1, wherein a taper of the sidewall of the ferrule is configured to stretch a sheet material of the flexible duct as the ferrule is threaded into the flexible duct.

11. The fitting assembly according to claim 1, wherein a pitch of the ferrule thread is less than or equal to a pitch of a helix structure of the flexible duct with the flexible duct fully elongated.

12. The fitting assembly according to claim 1, wherein an outer diameter of the ferrule thread is larger than an inner diameter of a helix structure of the flexible duct when a pitch of the ferrule thread is equal to a pitch of the helix structure.

13. The fitting assembly according to claim 1, wherein the connection between the fitting and the ferrule is substantially air tight without application of a sealant material.

14. The fitting assembly according to claim 1, further comprising a gasket or sealant material disposed at an interface of the fitting and the ferrule.

15. The fitting assembly according to claim 1, wherein the fitting comprises at least one of an elbow, a tee, a wye, a manifold takeoff, a coupling, a terminal boot, a cap, a plug, a union, and a flange.

16. A ferrule for connecting to a flexible duct, the ferrule comprising:
a sidewall defining a minor diameter and a major diameter spaced apart from the minor diameter;
a ferrule thread extending radially outward from the sidewall; and
multiple tabs configured to extend into a recess of a fitting, the multiple tabs configured to radially deflect and disengage from the recess of the fitting upon rotation of the ferrule relative to the fitting,
wherein a second end of the ferrule comprises the multiple tabs with each tab comprising a ramped surface extending in a circumferential direction of the ferrule, such that rotation of the ferrule relative to the fitting causes the ramped surface to radially deflect the tab and disengage the tabs and disengaging the tabs from the recess,
wherein the minor diameter is less than or equal to an inner diameter of the flexible duct with the flexible duct in an untensioned state, and
wherein the major diameter is greater than the inner diameter of the flexible duct with the flexible duct fully elongated.

17. The ferrule according to claim 16, wherein engagement of the tabs with the recess of the fitting limits rotation of the ferrule relative to the fitting about the a longitudinal axis of the ferrule and the fitting when a rotational force applied to the ferrule relative to the fitting is less than a force required to radially deflect the tabs.

18. The ferrule according to claim 16, wherein the ferrule thread includes a discontinuous portion.

19. The ferrule according to claim 18, wherein the discontinuous portion includes a break extending from a crest of the ferrule thread to the sidewall, wherein the break is configured to bite into the flexible duct to prevent unthreading of the flexible duct from the ferrule thread.

20. The ferrule according to claim 18, wherein the discontinuous portion comprises a ramped surface extending from the sidewall to a crest of the ferrule thread.

21. The ferrule according to claim 16, further comprising a circumferential depression for receiving a terminal end of the flexible duct.

22. The ferrule according to claim 16, wherein a taper of the sidewall is configured to stretch a sheet material of the flexible duct as the flexible duct is threaded onto the ferrule thread.

23. The ferrule according to claim 16, wherein an outer diameter of the ferrule thread is larger than an inner diameter of a helix structure of the flexible duct when a pitch of the ferrule thread is equal to a pitch of the helix structure.

24. A ferrule for connecting to a flexible duct, the ferrule comprising:
a sidewall defining a minor diameter and a major diameter spaced apart from the minor diameter;
a ferrule thread extending radially outward from the sidewall; and
multiple tabs configured to extend into a recess of a fitting, the multiple tabs configured to radially deflect and disengage from the recess of the fitting upon rotation of the ferrule relative to the fitting,
wherein a second end of the ferrule comprises the multiple tabs with each tab comprising a ramped surface extending in a circumferential direction of the ferrule, such that rotation of the ferrule relative to the fitting causes the ramped surface to radially deflect the tab and disengage the tabs and disengaging the tabs from the recess,
wherein the minor diameter is less than or equal to an inner diameter of the flexible duct with the flexible duct in an untensioned state, and
wherein the major diameter is greater than the inner diameter of the flexible duct with the flexible duct fully elongated,
wherein a pitch of the ferrule thread is less than a pitch of a helix structure of the flexible duct with the flexible duct fully elongated.

25. A ductwork assembly comprising:
a duct having a helix structure and a flexible sheet material surrounding the helix structure; and a ferrule comprising:
- a sidewall defining a minor diameter and a major diameter spaced apart from the minor diameter;
- a ferrule thread extending radially outward from the sidewall; and
  - multiple tabs configured to extend into a recess of a fitting, the multiple tabs configured to radially deflect and disengage from the recess of the fitting upon rotation of the ferrule relative to the fitting; and
- wherein a second end of the ferrule comprises the multiple tabs with each tab comprising a ramped surface extending in a circumferential direction of the ferrule, such that rotation of the ferrule relative to the fitting causes the ramped surface to radially deflect the tabs and disengaging the tabs from the recess,
  - wherein the minor diameter is less than or equal to an inner diameter of the flexible duct with the flexible duct in an untensioned state, and
  - wherein the major diameter is greater than the inner diameter of the flexible duct with the flexible duct fully elongated,
- wherein the helix structure of the duct is threaded over the ferrule thread such that the flexible sheet material of the duct is stretched radially outward by the sidewall of the ferrule.

26. The ductwork assembly according to claim 25, further comprising:
- a fitting removably connected to the ferrule, wherein the fitting comprises at least one of an elbow, a tee, a wye, a manifold takeoff, a coupling, a terminal boot, a cap, a plug, a union, and a flange.

* * * * *

UNITED STATES PATENT AND TRADEMARK OFFICE
CERTIFICATE OF CORRECTION

PATENT NO. : 11,821,646 B2
APPLICATION NO. : 16/817065
DATED : November 21, 2023
INVENTOR(S) : Robert Beach et al.

It is certified that error appears in the above-identified patent and that said Letters Patent is hereby corrected as shown below:

In the Claims

Column 15, Line 5, Claim 3, delete "the a" and insert -- a --

Column 16, Line 12, Claim 17, delete "the a" and insert -- a --

Signed and Sealed this
Twelfth Day of March, 2024

*Katherine Kelly Vidal*

Katherine Kelly Vidal
*Director of the United States Patent and Trademark Office*